(12) United States Patent
Byun

(10) Patent No.: US 11,080,198 B2
(45) Date of Patent: Aug. 3, 2021

(54) DATA PROCESSING SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 12 days.

(21) Appl. No.: 16/723,156

(22) Filed: Dec. 20, 2019

(65) Prior Publication Data

US 2020/0285581 A1 Sep. 10, 2020

(30) Foreign Application Priority Data

Mar. 5, 2019 (KR) .................... 10-2019-0025230

(51) Int. Cl.
| | |
|---|---|
| *G06F 12/0868* | (2016.01) |
| *G06F 12/0873* | (2016.01) |
| *G06F 12/02* | (2006.01) |
| *G06F 9/54* | (2006.01) |
| *G06F 13/16* | (2006.01) |
| *G06F 9/50* | (2006.01) |

(52) U.S. Cl.
CPC ........ *G06F 12/0868* (2013.01); *G06F 9/5016* (2013.01); *G06F 9/544* (2013.01); *G06F 12/0246* (2013.01); *G06F 12/0873* (2013.01); *G06F 13/1668* (2013.01); *G06F 2212/7201* (2013.01)

(58) Field of Classification Search
CPC ................... G06F 12/0246; G06F 2212/7201
See application file for complete search history.

(56) References Cited

U.S. PATENT DOCUMENTS

| | | | | |
|---|---|---|---|---|
| 10,860,228 | B1* | 12/2020 | Mulani | ................. G06F 3/0634 |
| 10,923,202 | B2* | 2/2021 | Palmer | ............... G11C 16/3431 |
| 2017/0109089 | A1* | 4/2017 | Huang | .................. G06F 3/0688 |
| 2019/0004944 | A1* | 1/2019 | Widder | .............. G06F 12/0292 |
| 2019/0196955 | A1* | 6/2019 | Chang | ................. G06F 11/1044 |
| 2019/0235762 | A1* | 8/2019 | Kaburaki | ............ G06F 12/0864 |
| 2020/0019346 | A1* | 1/2020 | Wu | ......................... G06F 3/068 |

FOREIGN PATENT DOCUMENTS

| | | |
|---|---|---|
| KR | 10-2015-0059056 | 5/2015 |
| KR | 10-2015-0059057 | 5/2015 |
| KR | 10-2015-0059058 | 5/2015 |
| KR | 10-2018-0050888 | 5/2018 |

* cited by examiner

*Primary Examiner* — Edward J Dudek, Jr.
(74) *Attorney, Agent, or Firm* — IP & T Group LLP

(57) ABSTRACT

A data processing system may include a host including a host memory and a first map manager and a memory system including a controller having a second map manager and a memory device suitable for storing system data. When the host provides a first mode request to the memory system, the memory system may provide the system data to the host in response to the first mode request and may deactivate the second map manager in response to the first mode request, and the host may store, in the host memory, the system data provided from the memory system, and may activate the first map manager when providing the first mode request.

20 Claims, 18 Drawing Sheets

DATA PROCESSING SYSTEM AND OPERATING METHOD THEREOF

CROSS-REFERENCE TO RELATED APPLICATION

This application claims priority under 35 U.S.C. § 119 to Korean Patent Application No. 10-2019-0025230 filed on Mar. 5, 2019, which is incorporated herein by reference in its entirety.

BACKGROUND

1. Field

Various embodiments relate to a data processing system and an operating method thereof, and more particularly, to a data processing system capable of improving data processing efficiency, and an operating method thereof.

2. Discussion of the Related Art

The computer environment paradigm has been transitioning to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a data processing system capable of efficiently processing data.

In an embodiment, a data processing system may include a host including a host memory and a first map manager and a memory system including a controller having a second map manager and a memory device suitable for storing system data. When the host provides a first mode request to the memory system, the memory system may provide the system data to the host in response to the first mode request and may deactivate the second map manager in response to the first mode request, and the host may store, in the host memory, the system data provided from the memory system, and may activate the first map manager when providing the first mode request.

In an embodiment, an operating method of a data processing system may include providing, by a host, a first mode request to a memory system, deactivating, by the memory system, a second map manager in the memory system in response to the first mode request, providing, by the memory system, the host with system data stored in a memory device in the memory system, in response to the first mode request, storing, by the host, the system data provided from the memory system in a host memory in the host, and activating, by the host, a first map manager in the host when providing the first mode request.

In an embodiment, a data processing system may include: a memory device configured to store system data; a host including a second control unit configured to provide a second mode request and an operational request along with a logical address; and a controller configured to control the memory device to perform an operation based on the logical address in response to the second mode request and the operational request, and update the system data stored in the memory device according to the operation, wherein the host further includes a first control unit configured to provide a first mode request, wherein the controller is further configured to provide system data from the memory device to the host in response to the first mode request, wherein the host further includes a host memory configured to buffer the system data provided from the controller, wherein the first control unit is further configured to provide an operational command along with a physical address based on the buffered system data, wherein the memory device is further configured to perform the operation based on the physical address in response to the operational command, and wherein the first control unit is further configured to: update the buffered system data according to the operation; and control the memory device to update the system data stored therein based on the buffered system data when providing the second mode request.

DETAILED DESCRIPTION

Hereafter, various embodiments of the present invention will be described with reference to the accompanying drawings. It should be understood that the following descriptions will be focused on portions required for understanding an operation in accordance with an embodiment, and descriptions of the other portions will be omitted in order not to unnecessarily obscure subject matters of the present disclosure.

Figure 1:
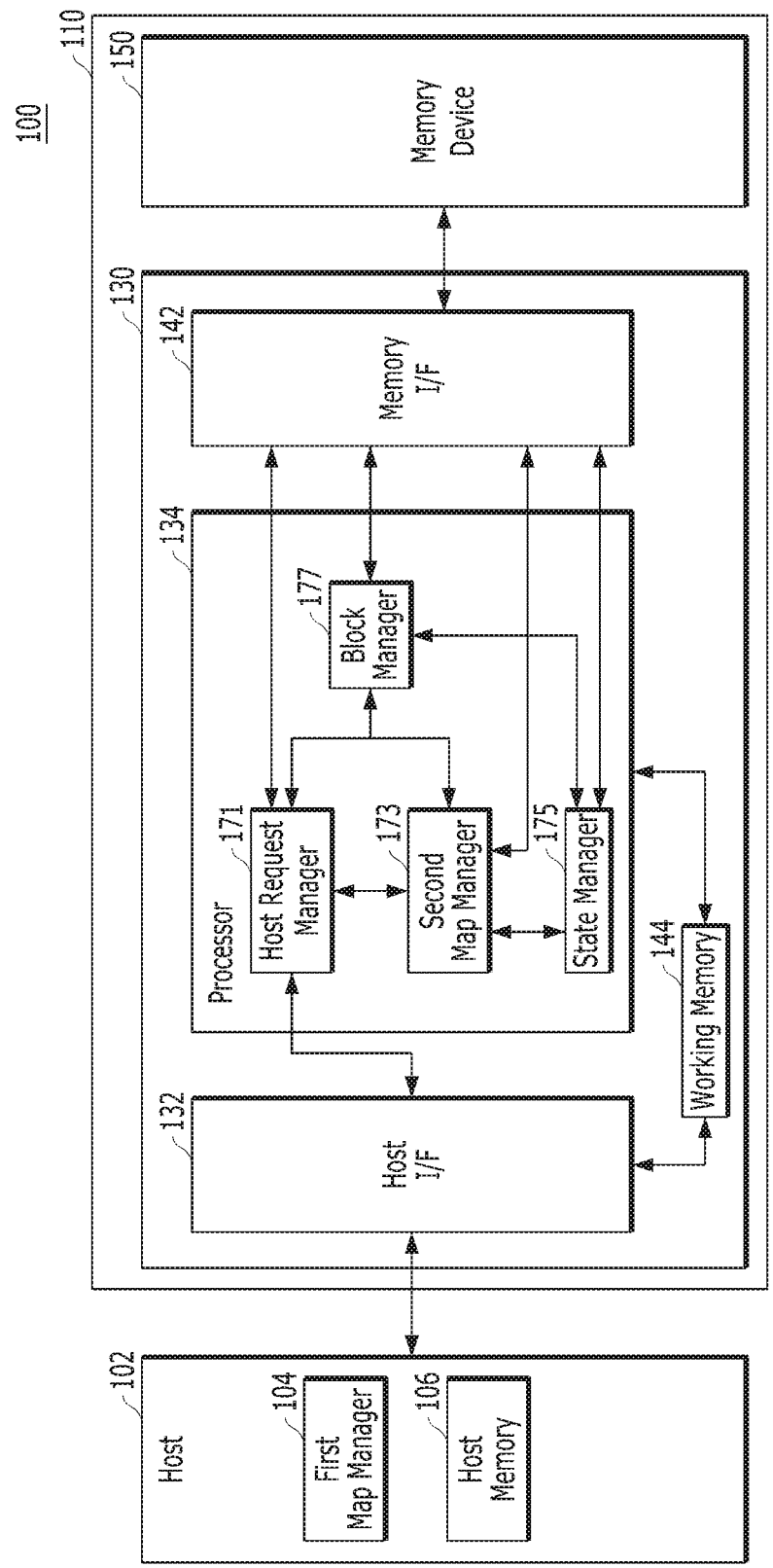
FIG. 1 is a diagram illustrating an example of a data processing system including a memory system in accordance with an embodiment.

FIG. 1 is a diagram schematically illustrating an example of a data processing system including a memory system in accordance with an embodiment.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operations between the host 102 and a user using the data processing system 100 or the memory system 110. The OS may support functions and operations corresponding to the use, purpose, and usage of a user.

The host 102 may include a first map manager 104 and a host memory 106.

The host memory 106 may store data required for driving the host 102. Furthermore, the host memory 106 may store system data provided from the memory system 110. The system data may include configuration information of the memory device 150, information on memory blocks, and mapping table information. The configuration information of the memory device 150 may include the number of dies in the memory device 150, the number of channels, the number of planes, the size of a page, the size of a spare memory block, the number of pages, and the number of memory blocks. The information on the memory blocks may include information on superblocks in the memory device 150, information on currently used memory blocks and empty memory blocks, and information indicating bad memory blocks. The mapping table information may indicate positions where map data are stored in the memory device 150.

The first map manager 104 may be driven by a file system in a first mode. The host 102 may determine whether to activate or deactivate the first map manager 104.

When the first map manager 104 is activated in the first mode, the first map manager 104 may manage a logical-physical mapping table based on the system data stored in the host memory 106, and process an internal request within the host 102. The first map manager 104 may store the entire mapping table in the host memory 106. The mapping table may be provided from the memory system 110, which will be described below.

The memory system 110 may store data in response to a request or a command provided from the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD), a personal computer memory card international association (PCMCIA) card, secure digital (SD) card including mini-SD card, micro-SD card and SDHC card, or universal flash storage (UFS) device. Non-limiting application examples of the memory system 110 may include a computer, a smart phone, and a portable game machine.

The memory device 150 of the memory system 110 may retain data stored therein even when no power is supplied. In particular, the memory device 150 may store data provided from the host 102 through a write operation, and provide data stored therein to the host 102 through a read operation.

Furthermore, the memory device 150 may store system data. In accordance with an embodiment, when the mode of the data processing system 100 is changed to the first mode, the controller 130 may provide the system data from the memory device 150 to the host 102 in the first mode. The host 102 may store the provided system data in the host memory 106. On the contrary, when the mode of the data processing system is changed to the second mode, the host 102 may provide the system data from the host memory 106 to the controller 130, and the controller 130 may store the provided system data in the memory device 150. The operation of the data processing system 100 will be described in detail with reference to FIGS. 5A and 6A.

The memory device 150 may include a plurality of memory blocks, each of the memory blocks may include a plurality of pages, and each of the pages may include a plurality of memory cells to which a word line WL is coupled. Furthermore, the memory device 150 may include a plurality of planes each including the plurality of memory blocks. In particular, the memory device 150 may include a plurality of memory dies each including the plurality of planes. The memory device 150 may be implemented with a nonvolatile memory device, for example, a flash memory. At this time, the flash memory may have a three-dimensional (3D) stack structure.

The structure of the memory device 150 and the 3D stack structure of the memory device 150 will be described in more detail with reference to FIGS. 2 to 4.

The controller 130 in the memory system 110 may control the memory device 150 in response to a request or a command from the host 102. For example, the controller 130 may provide data read from the memory device 150 to the host 102, and store data provided from the host 102 in the memory device 150. For this operation, the controller 130 may control read, write, program, and erase operations of the memory device 150.

The controller 130 may include a host interface (I/F) 132, a processor 134, a memory I/F 142 and a working memory 144.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

Also, the controller 130 may perform a background operation on the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

Specifically, the processor 134 may include a host request manager 171, a second map manager 173, a state manager 175 and a block manager 177, which are driven by a flash translation layer (FTL).

Similar to the above-described first map manager 104, the processor 134 may determine whether to activate or deactivate the second map manager 173. When the first map manager 104 stays activated in the first mode, the processor 134 may deactivate the second map manager 173. On the other hand, when the second map manager 173 stays activated in a second mode, the host 102 may deactivate the first map manager 104. That is, the data processing system 100 may activate only any one of the first and second map managers 104 and 173 in each of the first and second modes.

When the second map manager 173 is activated in the second mode, the second map manager 173 may manage a logical-physical mapping table, and process inquiry and update requests generated by the host request manager 171 and the state manager 175. The second map manager 173 may store the entire mapping table in the memory device 150, and cache mapping entries according to the capacity of the working memory 144. When a map cache miss occurs while the inquiry and update requests are processed, the second map manager 173 may transfer a read request to the memory I/F 142 to load system data (for example, mapping information) stored in the memory device 150.

In the second mode, the host request manager 171 may use the second map manager 173 and the block manager 177 to process read and program requests received from the host 102 through the host I/F 132. In order to recognize a physical address mapped to the logical address corresponding to the provided operational request, the host request manager 171 may transfer an inquiry request to the second map manager 173, and provide a read command for the physical address to the memory I/F 142 to process the read request. The host request manager 171 may transfer a write command to the block manager 177 to program data to a specific unwritten page of the memory device 150, and then transfer an update request for the program operation to the second map manager 173 to update the map information corresponding to the programmed data.

In the first mode, however, the host request manager 171 may use the block manager 177 to process read and write commands received from the host 102 through the host I/F 132. The host request manager 171 may provide a read command to the memory I/F 142 according to a physical address provided from the host 102. Furthermore, by transferring a write command to the block manager 177, the host request manager 171 may control the memory device 150 to program data according to the physical address allocated by the host 102 (for example, a specific page of the memory device 150), and then provide a program completion response to the host 102. The first map manager 104 may update the system data such that the logical address of the write data is mapped to the physical address where the write data is actually stored. Specifically, the first map manager 104 may update the mapping table including map information on the write data.

In the second mode, the block manager 177 may convert program requests of the host request manager 171, the second map manager 173 and the state manager 175 into write commands for the memory device 150, in order to manage the memory blocks within the memory device 150. In the first mode, the block manager 177 may transfer the write command provided from the first map manager 104 to the memory device 150, in order to manage the memory blocks within the memory device 150.

In order to improve the program performance of the memory system 110, the block manager 177 may provide a write command for a multi-plane and one-shot program operation to the memory I/F 142.

The block manager 177 may manage the memory blocks according to the number of valid pages. The block manager 177 may select and erase an invalid block when a spare memory block is needed, and select a victim block including the least number of valid pages when garbage collection is needed. In order for the block manager 177 to secure a sufficient number of empty blocks, the state manager 175 may collect valid data, move the collected valid data to an empty block, and erase invalid blocks by performing garbage collection.

The working memory 144 may serve as a working memory of the memory system 110 and the controller 130, and store data for driving the memory system 110 and the controller 130. Furthermore, the working memory 144 may store some of the system data. For example, the working memory 144 may store some of the map information stored in the memory device 150.

The working memory 144 may be embodied by a volatile memory. For example, the working memory 144 may be embodied by static random access memory (SRAM) or dynamic random access memory (DRAM). The working memory 144 may be disposed within or out of the controller 130. FIG. 1 exemplifies the working memory 144 disposed within the controller 130. In an embodiment, the working memory 144 may be embodied by an external volatile memory having a memory interface transferring data between the memory 144 and the controller 130.

As described above, the working memory 144 may store data required for performing a data write/read operation between the host and the memory device 150, and data when the data write/read operation is performed. In order to store such data, the working memory 144 may include a program memory, data memory, write buffer/cache, read buffer/cache, data buffer/cache, map buffer/cache or the like.

Although not illustrated in the drawing, the controller 130 may further include an error correction code (ECC) unit and a power management unit (PMU).

The ECC may correct an error bit of data processed by the memory device 150, and include an ECC encoder and an ECC decoder.

The ECC encoder may generate data with a parity bit by performing error correction encoding on data to be programmed into the memory device 150, and the data with the parity bit may be stored in the memory device 150. The ECC decoder detects and corrects errors included in data read from the memory device 150 when reading the data stored in the memory device 150.

The ECC unit may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC is not limited to any specific structure. The ECC unit may include any and all circuits, modules, systems or devices for error correction.

The PMU may provide and manage power of the controller 130. That is, the PMU may provide and manage power of the components included in the controller 130.

Hereafter, referring to FIGS. 2 to 4, the memory device of the memory system in accordance with the present embodiment will be described in more detail.

Figure 2:
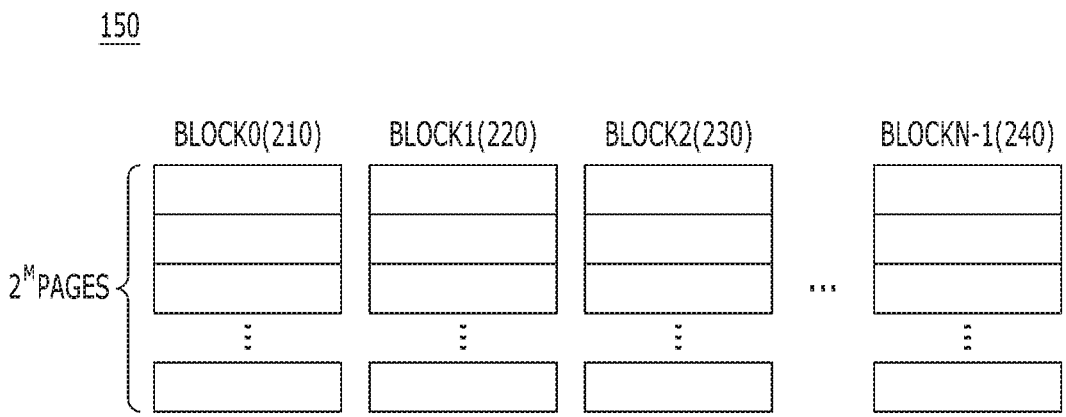
FIG. 2 is a diagram illustrating a map region and a user region which are included in a memory device in accordance with an embodiment.
Figure 3:
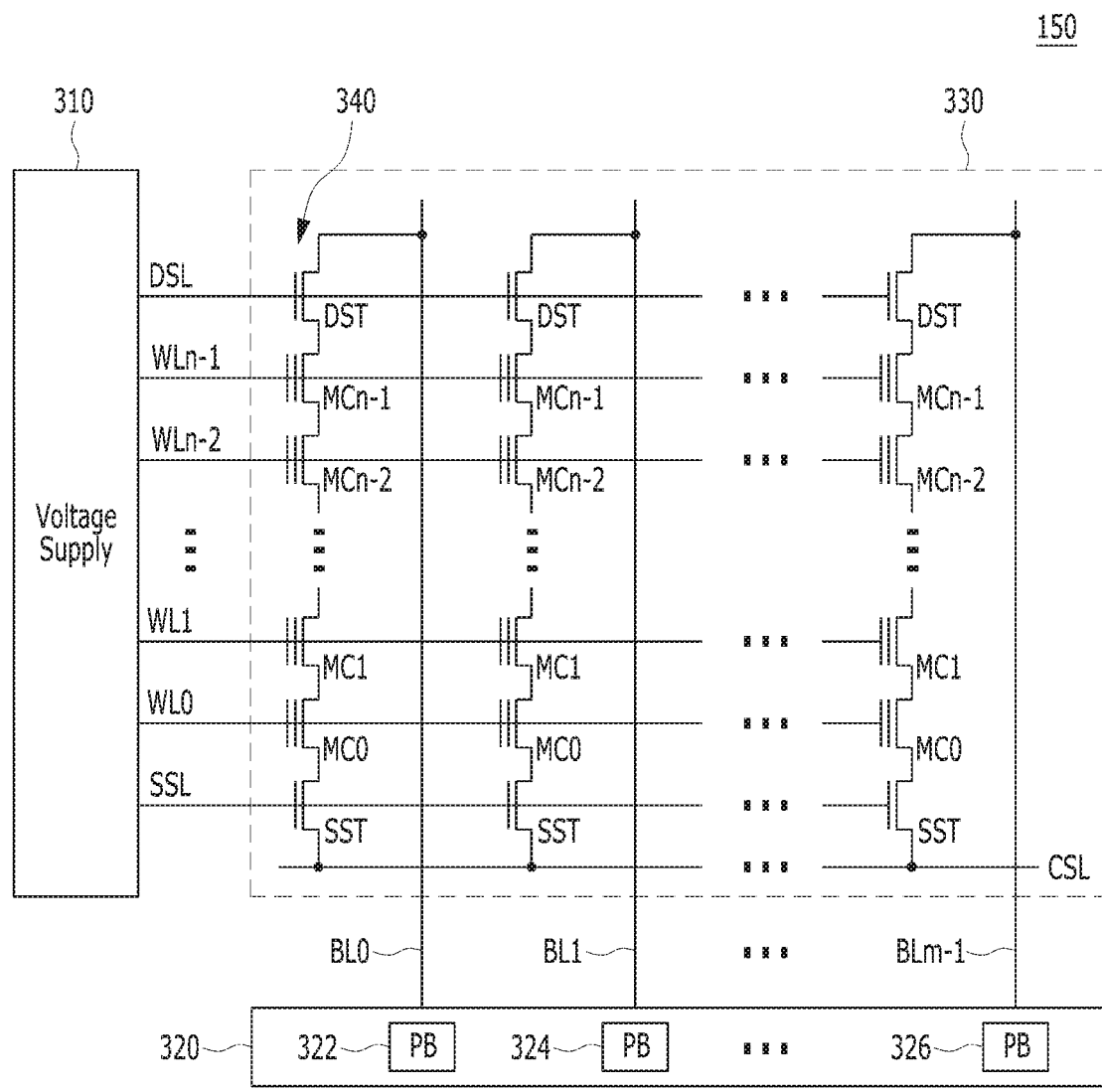
FIG. 3 is a diagram illustrating components of the memory device in accordance with an embodiment.
Figure 4:
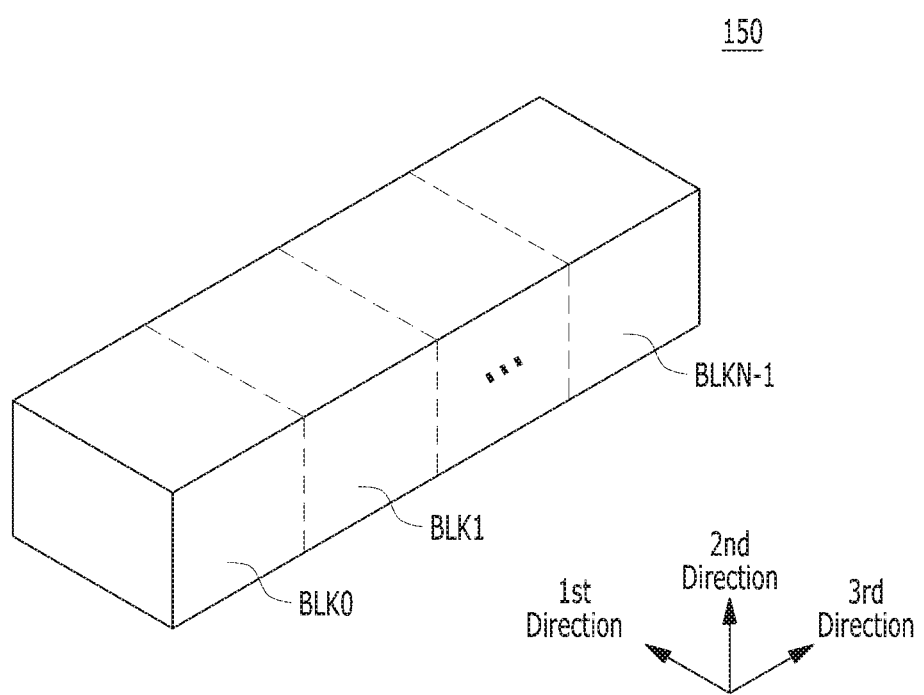
FIG. 4 is a diagram schematically illustrating an example of the memory device in the memory system in accordance with an embodiment.

FIG. 2 is a schematic diagram illustrating the memory device 150, FIG. 3 is a circuit diagram illustrating a configuration of a memory cell array of a memory block in the memory device 150, and FIG. 4 is a schematic diagram illustrating a 3D structure of the memory device 150.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a word line WL.

The memory device 150 may include not only the MLC memory blocks, each of which includes a plurality of pages that are realized by memory cells capable of storing two-bit data in one memory cell, but also triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or multiple level cell memory blocks each of which includes a plurality of pages that are realized by memory cells capable of storing five or more-bit data in one memory cell, and so forth.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230, . . . 240 may store the data transferred from the host 102 through a program operation, and transfer data stored therein to the host 102 through a read operation.

Referring to FIG. 3, a memory block 330, which may correspond to any of the plurality of memory blocks included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate such as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLOCK0 to BLOCKN−1.

Each memory block 330 included in the memory device 150 may include a plurality of NAND strings NS that are extended in the second direction, and a plurality of NAND strings NS (not shown) that are extended in the first direction and the third direction. Each of the NAND strings NS may be coupled to a bit line BL, at least one drain selection line DSL, at least one source selection line SSL, a plurality of word lines WL, at least one dummy word line DWL (not shown), and a common source line CSL, and each of the NAND strings NS may include a plurality of transistor structures.

In short, each memory block 330 of the memory device 150 may be coupled to a plurality of bit lines BL, a plurality of drain selection lines DSL, a plurality of source selection lines SSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a drain selection transistor DST of each NAND string NS may be coupled to a corresponding bit line BL, and a source selection transistor SST of each NAND string NS may be coupled to a common source line CSL. Memory cells MC may be provided between the drain selection transistor DST and the source selection transistor SST of each NAND string NS. In other words, a plurality of memory cells may be realized in each memory block 330 of the memory device 150.

FIGS. 5A to 5E are diagrams illustrating a data processing system 100 in accordance with an embodiment.

Figure 5A:
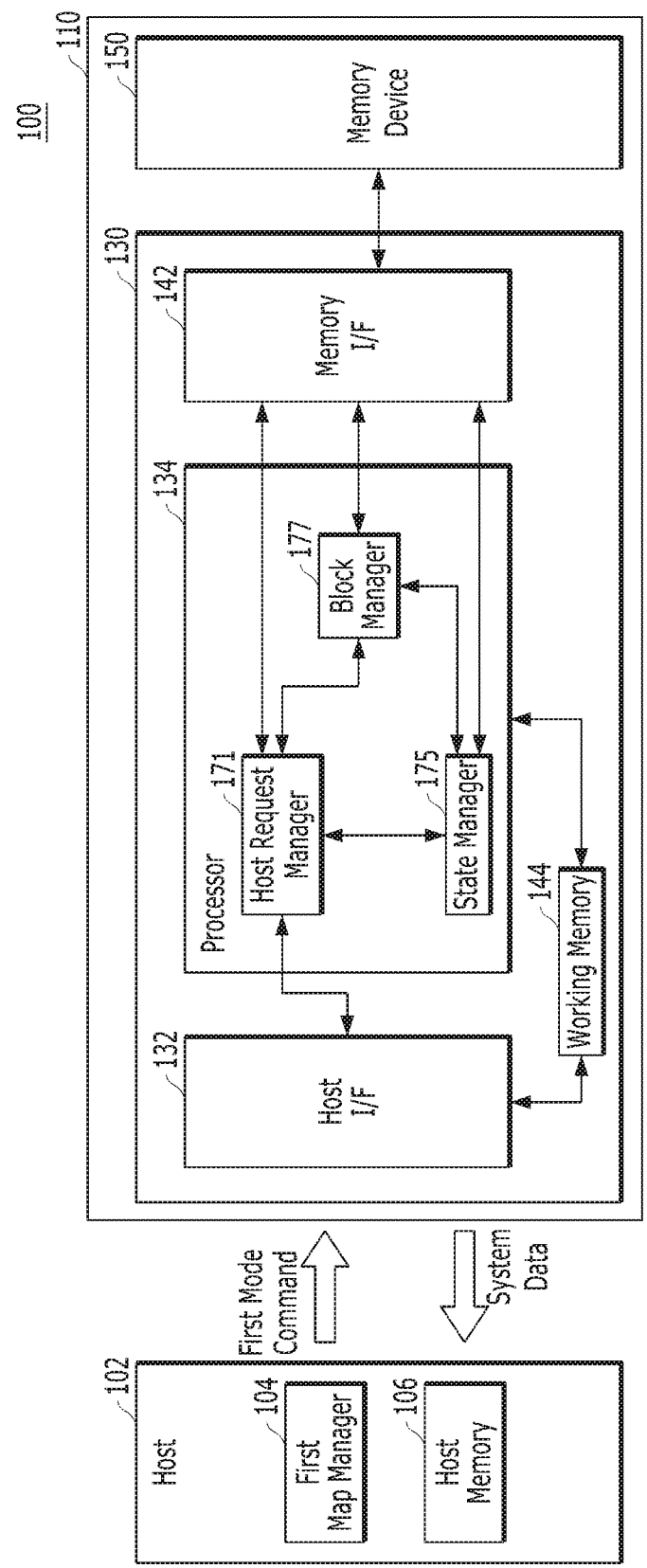
FIG. 5A is a block diagram illustrating a structure of a data processing system in accordance with an embodiment.

FIG. 5A is a block diagram illustrating the structure of the data processing system 100 in accordance with the present embodiment. In particular, FIG. 5A illustrates the components of the data processing system 100 operating in the first mode, and illustrates a logical flow of data among the components within the data processing system 100. For convenience of description, the data processing system 100 is currently set to the second mode.

First, in order to set the data processing system 100 to the first mode, the host 102 may provide a first mode request to the controller 130.

When the controller 130 receives the first mode request, the processor 134 may deactivate the second map manager 173 which has operated in the second mode. FIG. 5A does not illustrate the deactivated second map manager 173. As a result, the processor 134 may process a host command (for example, a read command or program command) provided from the host 102 by utilizing the host request manager 171, the state manager 175 and the block manager 177.

The processor 134 may provide the host 102 with the system data stored in the memory device 150 as a response to the first mode request.

The host 102 may store the system data received from the controller 130 in the host memory 106. Then, the host 102 may activate the first map manager 104.

Figure 5B:
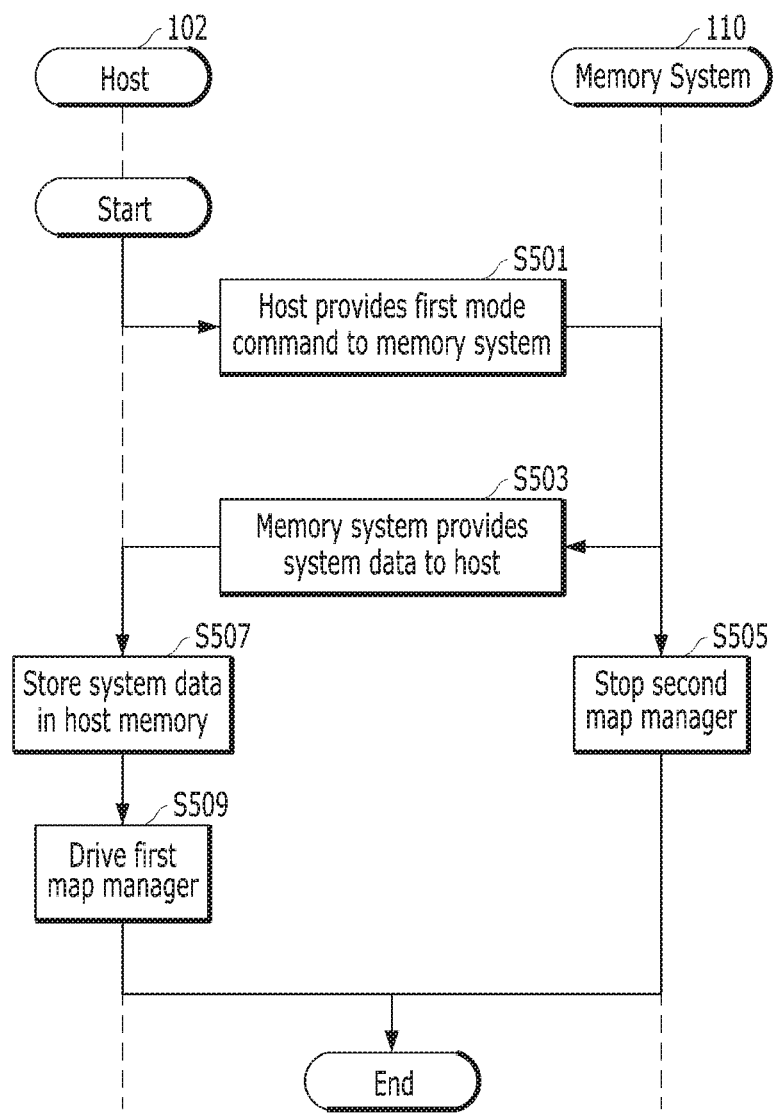
FIGS. 5B to 5E are flowcharts illustrating an operation process of the data processing system in accordance with an embodiment.

FIG. 5B is a flowchart illustrating an operation process of the data processing system 100 in accordance with an embodiment. In particular, FIG. 5B illustrates an operation process of setting the data processing system 100 to the first mode.

In step S501, the host 102 may provide the first mode request to the memory system 110.

In step S503, the memory system 110 may provide the host 102 with the system data stored in the memory device 150 in response to the first mode request. Specifically, the processor 134 may load the system data stored in the memory device 150 through the memory I/F 142, and provide the loaded system data to the host 102 through the host I/F 132.

In step S505, the memory system 110 may deactivate the second map manager 173. Specifically, the processor 134 may deactivate the second map manager 173 by utilizing the FTL.

Although steps S503 and S505 are separately illustrated in FIG. 5B, the memory system 110 may perform steps S503 and S505 at the same time.

In step S507, the host 102 may store the system data in the host memory 106.

Then, in step S509, the host 102 may activate the first map manager 104 by utilizing the file system.

Figure 5C:
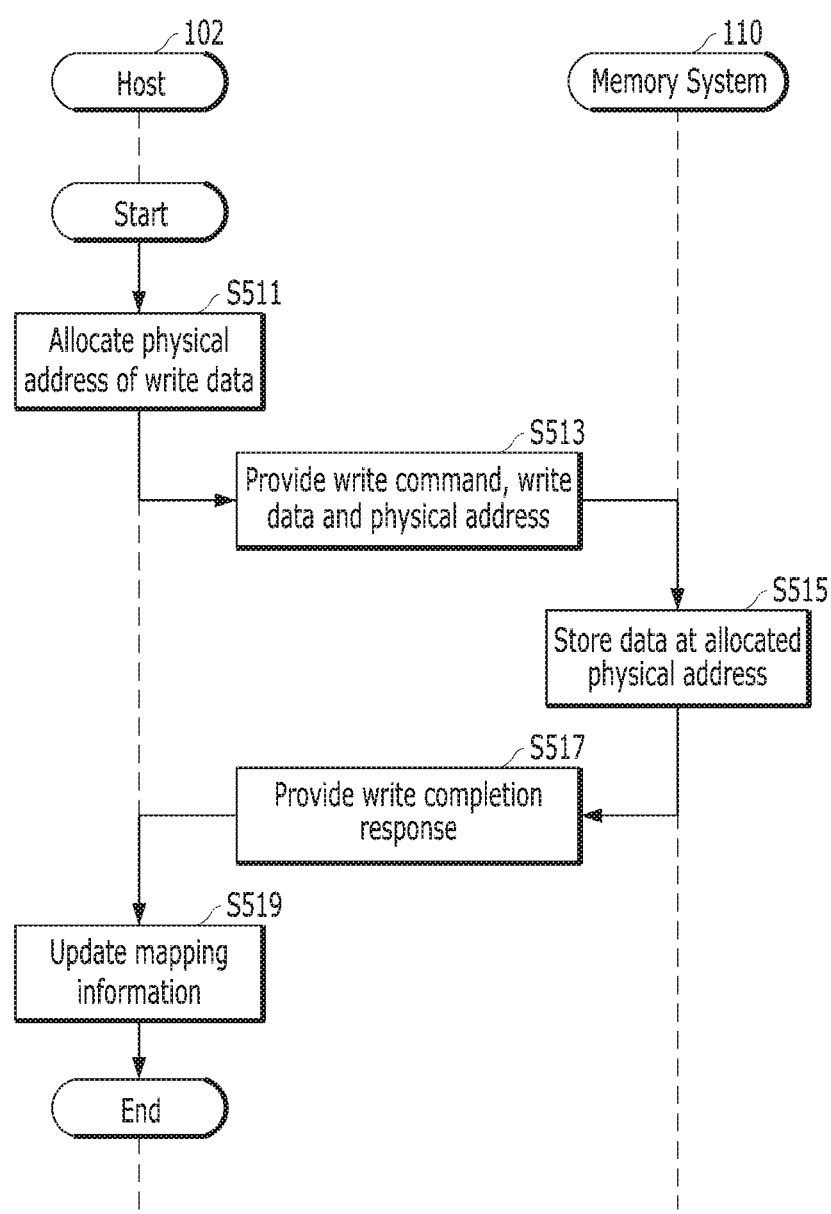

FIG. 5C is a flowchart illustrating an operation process of the data processing system 100 in accordance with an embodiment. In particular, FIG. 5C illustrates a program operation process of the data processing system 100 operating in the first mode.

In step S511, the first map manager 104 within the host 102 may allocate a physical address of write data, based on the system data stored in the host memory 106.

In step S513, the host 102 may provide the memory system 110 with a write command, the write data, and the physical address corresponding to the write data.

In step S515, the memory system 110 may store the write data in the memory device 150 according to the write command and the physical address which are received from the host 102. Specifically, the host I/F 132 may receive the write command, the write data and the physical address from the host 102. The processor 134 may temporarily store the write data in the working memory 144. The host request manager 171 within the processor 134 may provide the block manager 177 with the write command received from the host I/F 132 to program the data according to the physical address allocated by the host 102. The block manager 177 may provide the write command to the memory device 150 through the memory I/F 142. Then, the memory device 150 may store the write data at the received physical address.

In step S517, the memory system 110 may inform the host 102 of the completion of the write operation as a response to the write command. Specifically, when the operation of programming the write data to the memory device 150 is completed, the processor 134 may provide a write completion signal to the host 102 through the host I/F 132.

In step S519, the first map manager 104 may update the system data such that the logical address of the write data is mapped to the physical address where the write data is actually stored. Specifically, the first map manager 104 may update the mapping table including map information on the write data.

Figure 5D:
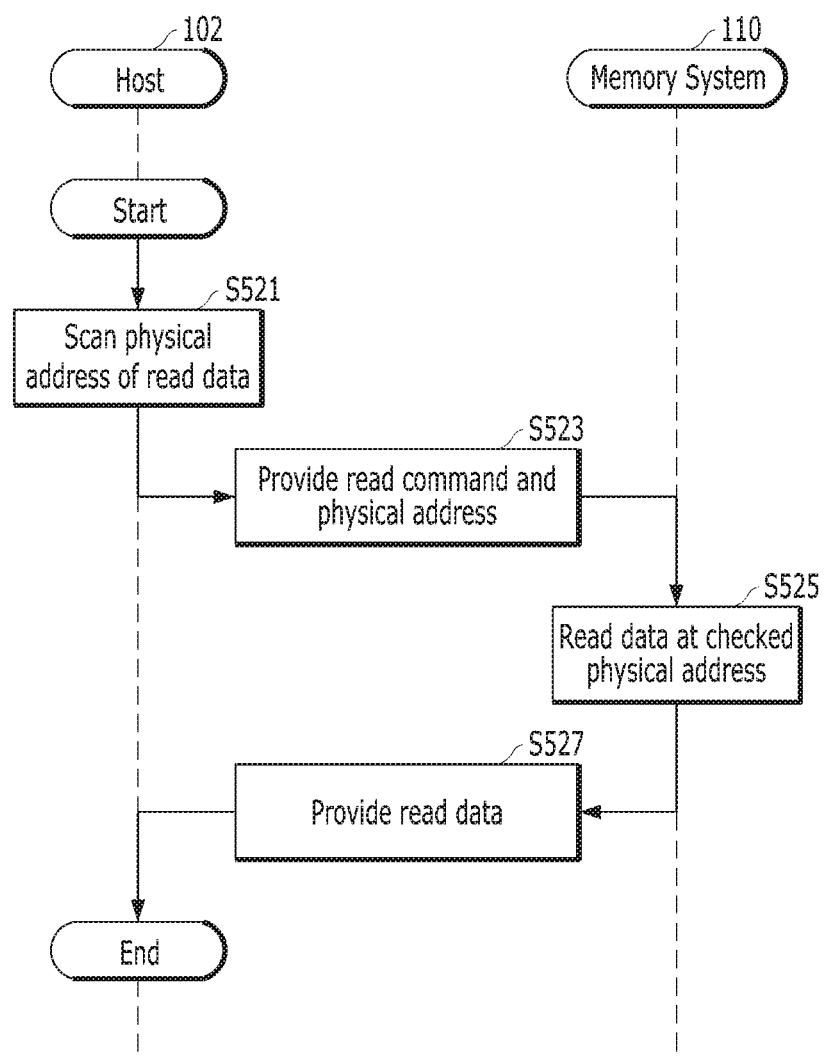

FIG. 5D is a flowchart illustrating an operation process of the data processing system 100 in accordance with an embodiment. In particular, FIG. 5D illustrates a read operation process of the data processing system 100 operating in the first mode.

In step S521, the first map manager 104 within the host 102 may scan a physical address of to-be-read data based on the system data stored in the host memory 106.

In step S523, the host 102 may provide the memory system 110 with a read command and the physical address corresponding to the to-be-read data.

In step S525, the controller 130 within the memory system 110 may read data from the memory device 150 according to the read command and the physical address which are received from the host 102. Specifically, the host I/F 132 may receive the read command and the physical address from the host 102. Then, the host request manager 171 within the processor 134 may provide the block manager 177 with the read command received from the host I/F 132 to read the data according to the physical address. The block manager 177 may provide the read command to the memory device 150 through the memory I/F 142. Then, the memory device 150 may read the data according to the physical address.

In step S527, the memory system 110 may provide the host 102 with the read data as a response to the read command. Specifically, the memory device 150 may provide the read data to the controller 130, and the processor 134 may provide the read data to the host 102 through the host I/F 132.

Figure 5E:
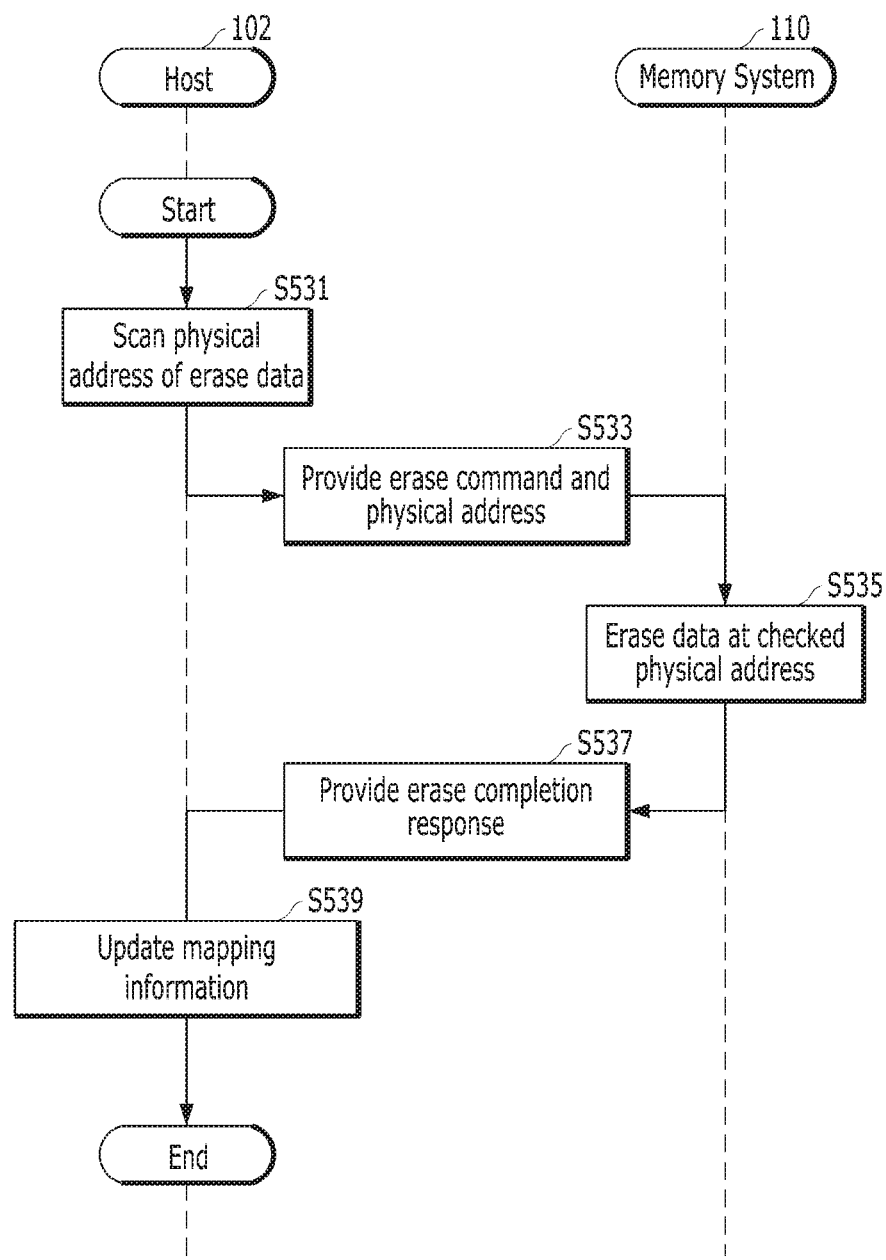

FIG. 5E is a flowchart illustrating an operation process of the data processing system 100 in accordance with an embodiment. In particular, FIG. 5E illustrates an erase operation process of the data processing system 100 operating in the first mode.

In step S531, the first map manager 104 within the host 102 may scan a physical address of to-be-erased data, based on the system data stored in the host memory 106.

In step S533, the host 102 may provide the memory system 110 with an erase command and the physical address corresponding to the to-be-erased data.

In step S535, the controller 130 within the memory system 110 may erase data from the memory device 150 according to the erase command and the physical address which are received from the host 102. Specifically, the host I/F 132 may receive the erase command and the physical address from the host 102. Then, the host request manager 171 within the processor 134 may provide the block manager 177 with the erase command received from the host I/F 132 to erase the data according to the physical address. The block manager 177 may provide the erase command to the memory device 150 through the memory I/F 142. Then, the memory device 150 may erase the data according to the physical address.

In step S537, the memory system 110 may provide the host 102 with an erase completion response as a response to the erase command.

In step S539, the first map manager 104 may update the system data to unmap the physical address and a logical address corresponding to the erased data. Specifically, the first map manager 104 may update the mapping table including map information on the erased data.

Although not illustrated in FIGS. 5A to 5E, the host 102 may include a first control unit. The first control unit may include the first map manager 104. The process of the host 102 described with reference to FIGS. 5A to 5E may be performed by the first control unit. The first control unit may be driven by the file system within the host 102.

FIGS. 6A to 6E are diagrams illustrating a data processing system 100 in accordance with an embodiment.

Figure 6A:
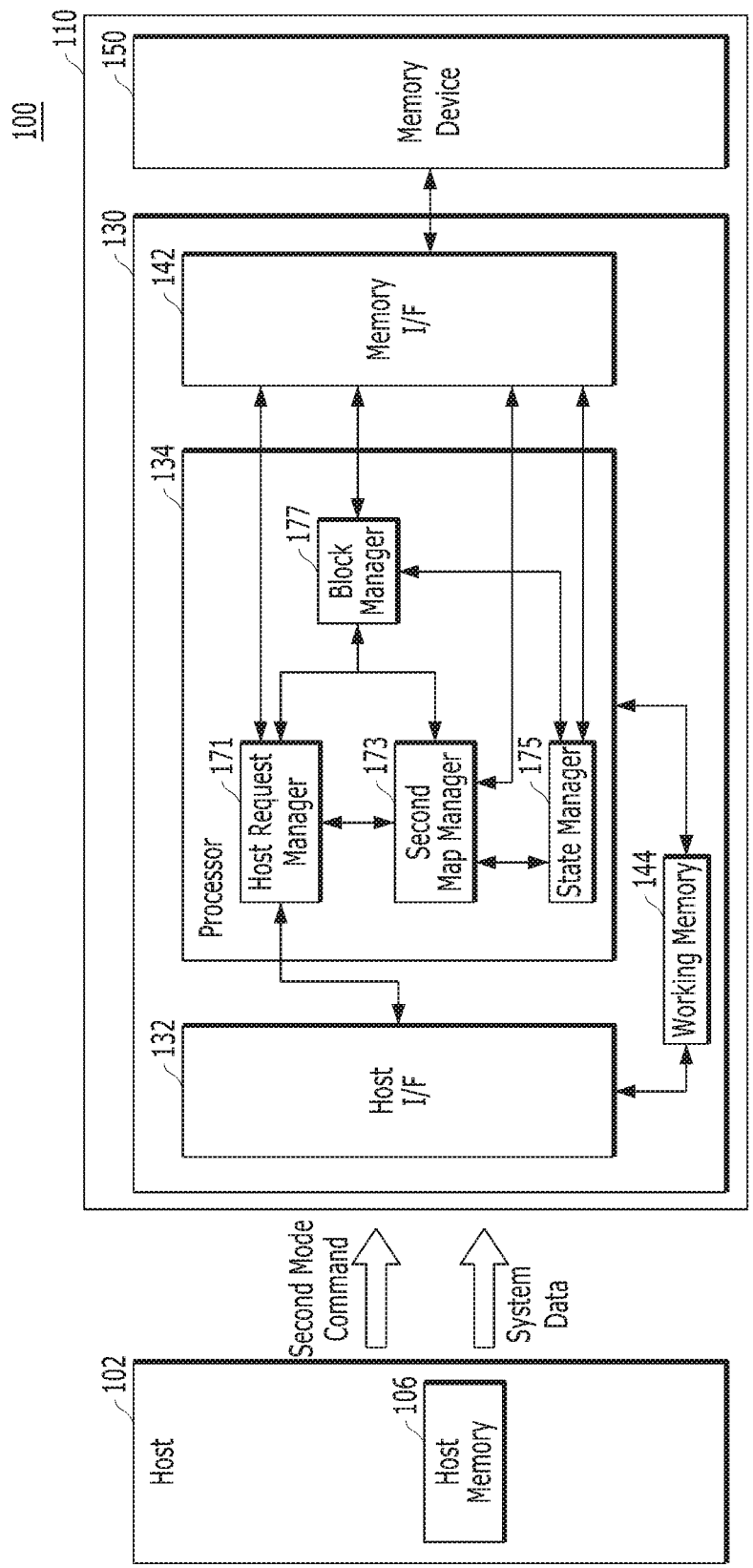
FIG. 6A is a block diagram illustrating a structure of a data processing system in accordance with an embodiment.

FIG. 6A is a block diagram illustrating the structure of the data processing system 100 in accordance with an embodiment. In particular, FIG. 6A illustrates the components of the data processing system 100 operating in the second mode, and illustrates a logic flow of data among the components within the data processing system 100. For convenience of description, the data processing system 100 is currently set to the first mode.

First, in order to set the data processing system 100 to the second mode, the host 102 may provide a second mode request to the controller 130. Furthermore, the host 102 may provide the system data stored in the host memory 106 to the controller 130.

The host 102 may deactivate the first map manager 104 which has been activated in the first mode. FIG. 6A does not illustrate the deactivated first map manager 104.

The controller 130 may store the system data received from the host 102 in the memory device 150. Then, the controller 130 may activate the second map manager 173 within the processor 134. As a result, the processor 134 may process a host request (for example, a read request or program request) provided from the host 102 by utilizing the host request manager 171, the second map manager 173, the state manager 175 and the block manager 177.

Figure 6B:
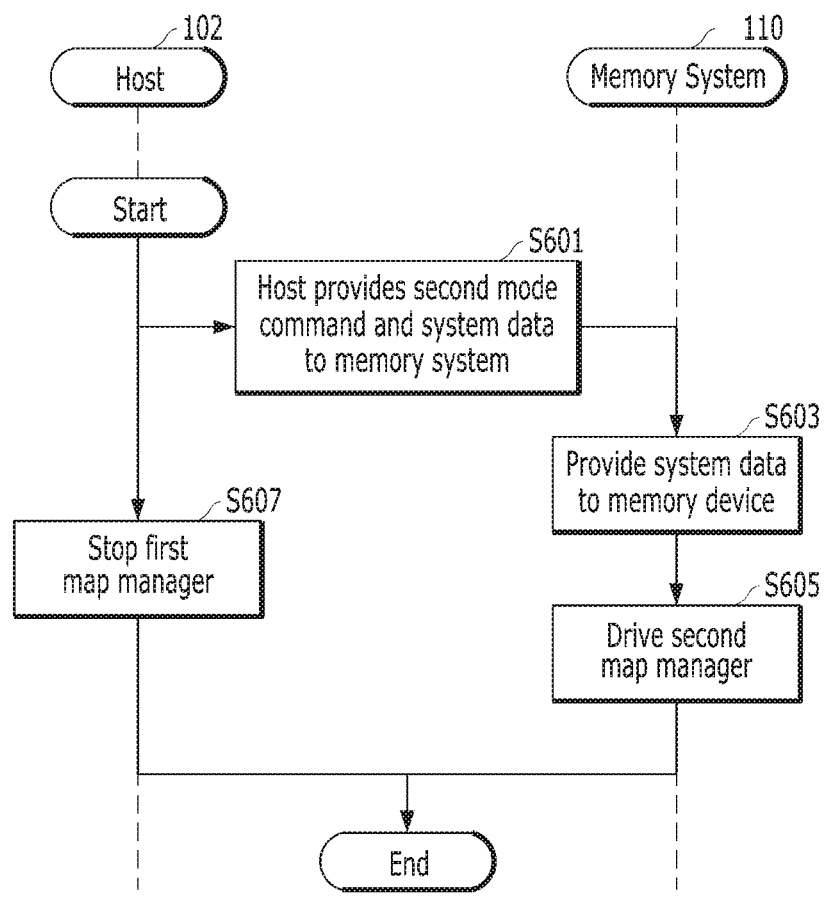
FIGS. 6B to 6E are flowcharts illustrating an operation process of the data processing system in accordance with an embodiment.

FIG. 6B is a flowchart illustrating an operation process of the data processing system 100 in accordance with an embodiment. In particular, FIG. 6B illustrates an operation process of setting the data processing system 100 to the second mode.

In step S601, the host 102 may provide the second mode request and the system data to the memory system 110.

In step S603, the memory system 110 may store the system data received from the host 102 in the memory device. Specifically, the controller 130 may store the system data received from the host 102 in the memory device 150.

In step S605, the memory system 110 may activate the second map manager 173. Specifically, the processor 134 may activate the second map manager 173 by utilizing the FTL.

In step S607, the host 102 may deactivate the first map manager 104 by utilizing the file system.

Although steps S603, S605 and S607 are separately illustrated in FIG. 6B, the memory system 110 and the host 102 may perform steps S603, S605 and S607 at the same time.

Figure 6C:
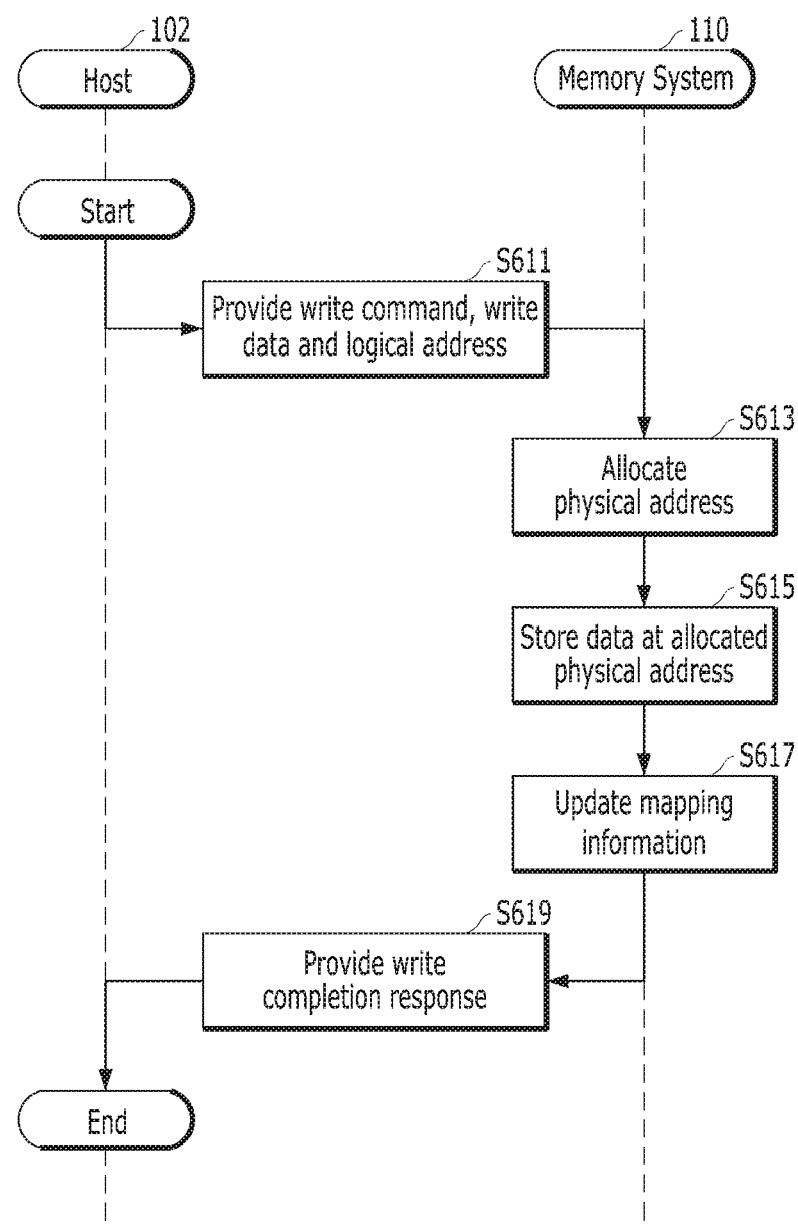

FIG. 6C is a flowchart illustrating an operation process of the data processing system 100 in accordance with an embodiment. In particular, FIG. 6C illustrates a program operation process of the data processing system 100 operating in the second mode.

In step S611, the host 102 may provide the memory system 110 with a write request, write data, and a logical address corresponding to the write data.

In step S613, the memory system 110 may allocate a physical address corresponding to the write data. Specifically, the host request manager 171 within the processor 134 may request the second map manager 173 to allocate the physical address for the write data. Then, the second map manager 173 may allocate the physical address of the write data.

In step S615, the memory system 110 may store the write data in the memory device 150 according to the write request received from the host 102 and the physical address allocated by the second map manager 173. The host request manager 171 within the processor 134 may provide the block manager 177 with a write command to program the data according to the physical address. The block manager 177 may provide the write command to the memory device 150 through the memory I/F 142. Then, the memory device 150 may store the write data at the physical address.

In step S617, the memory system 110 may update the system data such that the logical address of the write data is mapped to the physical address where the write data is actually stored. Specifically, the memory device 150 may inform the controller 130 of the completion of the program operation for the write data. After being informed of the completion of the program operation by the memory device 150, the second map manager 173 may update a mapping table including map information on the write data.

In step S619, the memory system 110 may inform the host 102 of the completion of the write operation as a response to the write request.

Figure 6D:
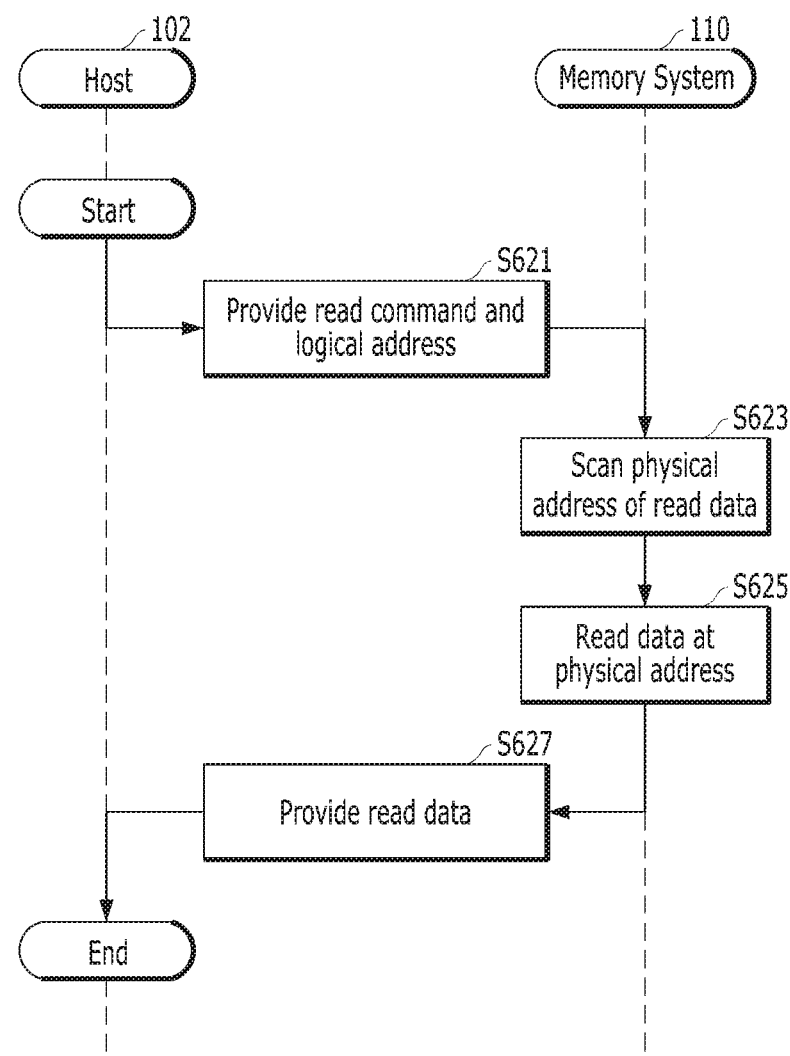

FIG. 6D is a flowchart illustrating an operation process of the data processing system 100 in accordance with an embodiment. In particular, FIG. 6D illustrates a read operation process of the data processing system 100 operating in the second mode.

In step S621, the host 102 may provide the memory system 110 with a read request and a logical address corresponding to data to be read.

In step S623, the second map manager 173 within the processor 134 may scan a physical address of the to-be-read data. First, the second map manager 173 may scan the physical address of the to-be-read data within the working memory 144. When a map cache miss occurs, the second map manager 173 may transfer a read request to the memory I/F 142 to load the physical address of the to-be-read data stored in the memory device 150.

In step S625, the controller 130 may control the memory device 150 to read data from the memory device 150 according to the read request received from the host 102 and the physical address scanned by the second map manager 173.

In step S627, the memory system 110 may provide the host 102 with the read data as a response to the read request. Specifically, the memory device 150 may provide the read data to the controller 130, and the processor 134 may provide the read data to the host 102 through the host I/F 132.

Figure 6E:
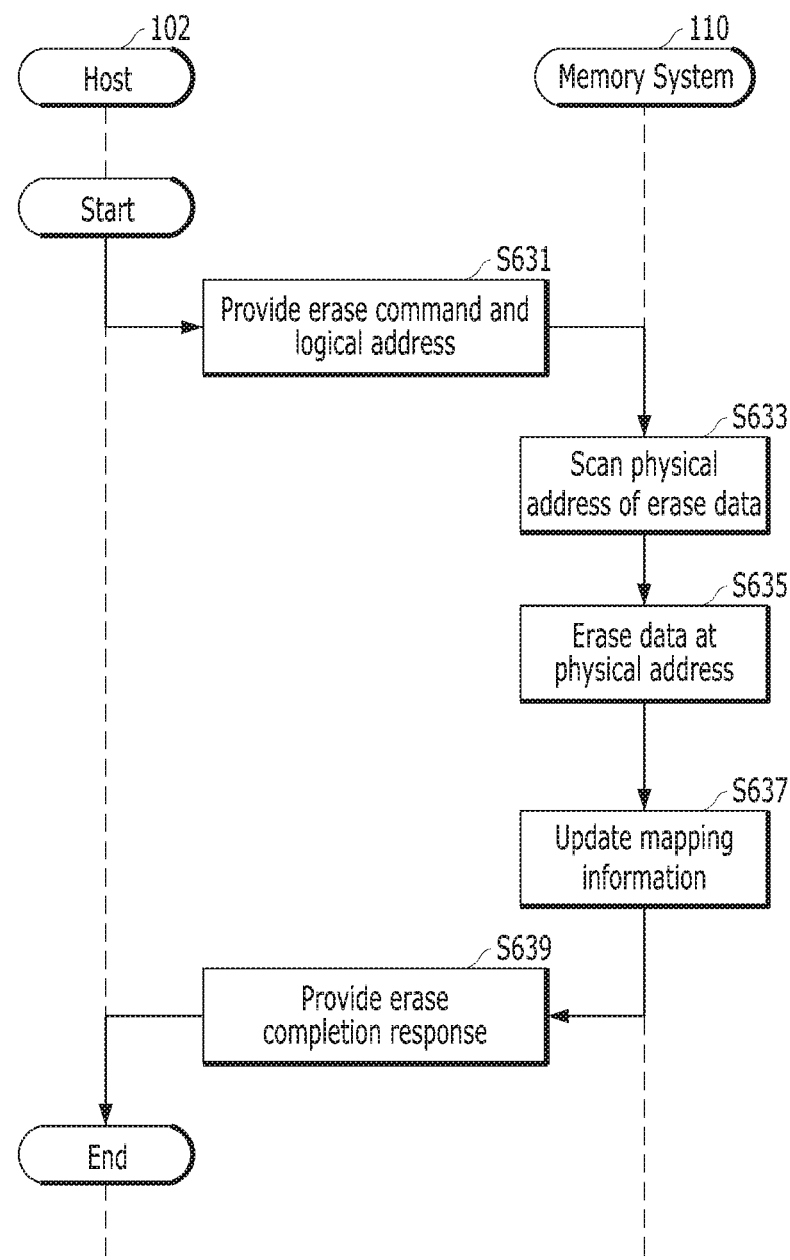

FIG. 6E is a flowchart illustrating an operation process of the data processing system 100 in accordance with an embodiment. In particular, FIG. 6E illustrates an erase operation process of the data processing system 100 operating in the second mode.

In step S631, the host 102 may provide the memory system 110 with an erase request and a logical address corresponding to data to be erased.

In step S633, the second map manager 173 within the processor 134 may scan a physical address of to-be-erased data. First, the second map manager 173 may scan the physical address of the to-be-erased data within the working memory 144. When a map cache miss occurs, the second map manager 173 may transfer a read request to the memory I/F 142 to load the physical address of the to-be-erased data stored in the memory device 150.

In step S635, the controller 130 may control the memory device 150 to erase the data from the memory device 150 according to the erase request received from the host 102 and the physical address scanned by the second map manager 173.

In step S637, the second map manager 173 may update the system data to unmap the physical address and the logical address corresponding to the erased data. Specifically, the second map manager 173 may update the mapping table including map information on the erased data.

In step S639, the memory system 110 may provide the host 102 with an erase completion response as a response to the erase request.

As described above, the data processing system 100 may improve the resource utilization of the host 102 through the plurality of modes, and expand the compatibility of the memory system 110.

Although not illustrated in FIGS. 6A to 6E, the host 102 may include a second control unit. The process of the host 102 described with reference to FIGS. 6A to 6E may be performed by the second control unit.

FIGS. 7 to 15 are diagrams schematically illustrating application examples of the data processing system of FIGS. 1 to 6E according to various embodiments.

Figure 7:
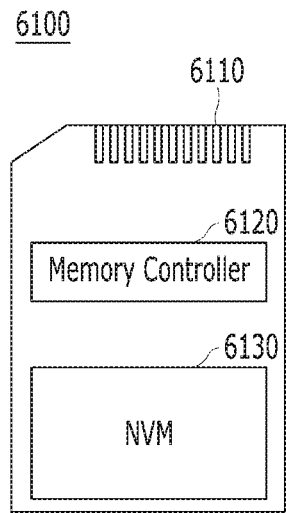
FIGS. 7 to 15 are diagrams schematically illustrating examples of a data processing system including a memory system in accordance with an embodiment.

FIG. 7 is a diagram schematically illustrating the data processing system including the memory system in accordance with an embodiment. FIG. 7 schematically illustrates a memory card system 6100 to which the memory system in accordance with an embodiment is applied.

Referring to FIG. 7, the memory card system 6100 may include a memory controller 6120, a memory device 6130 and a connector 6110.

Specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) and a universal flash storage (UFS).

Figure 8:
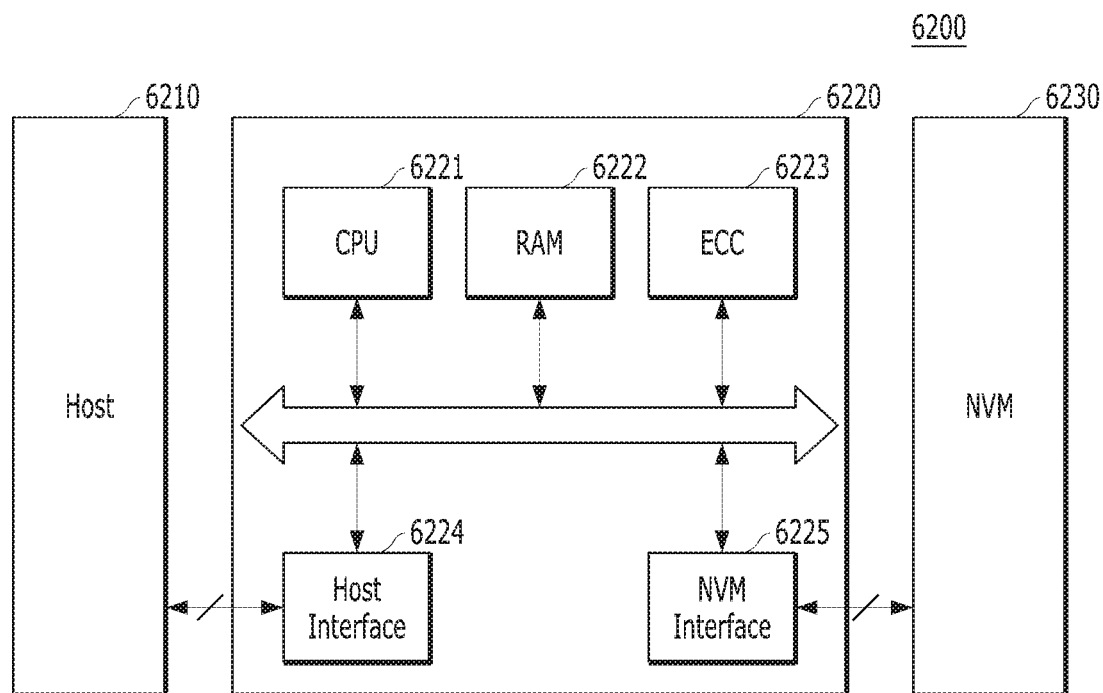

FIG. 8 is a diagram schematically illustrating another example of a data processing system 6200 including the memory system in accordance with an embodiment.

Referring to FIG. 8, the data processing system 6200 may include a memory device 6230 having one or more non-volatile memories (NVMs) and a memory controller 6220 for controlling the memory device 6230. The data processing system 6200 may serve as a storage medium such as a memory card (CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit and/or receive data to and/or from the host 6210 through the host interface 6224, and transmit/receive data to/from the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 9:
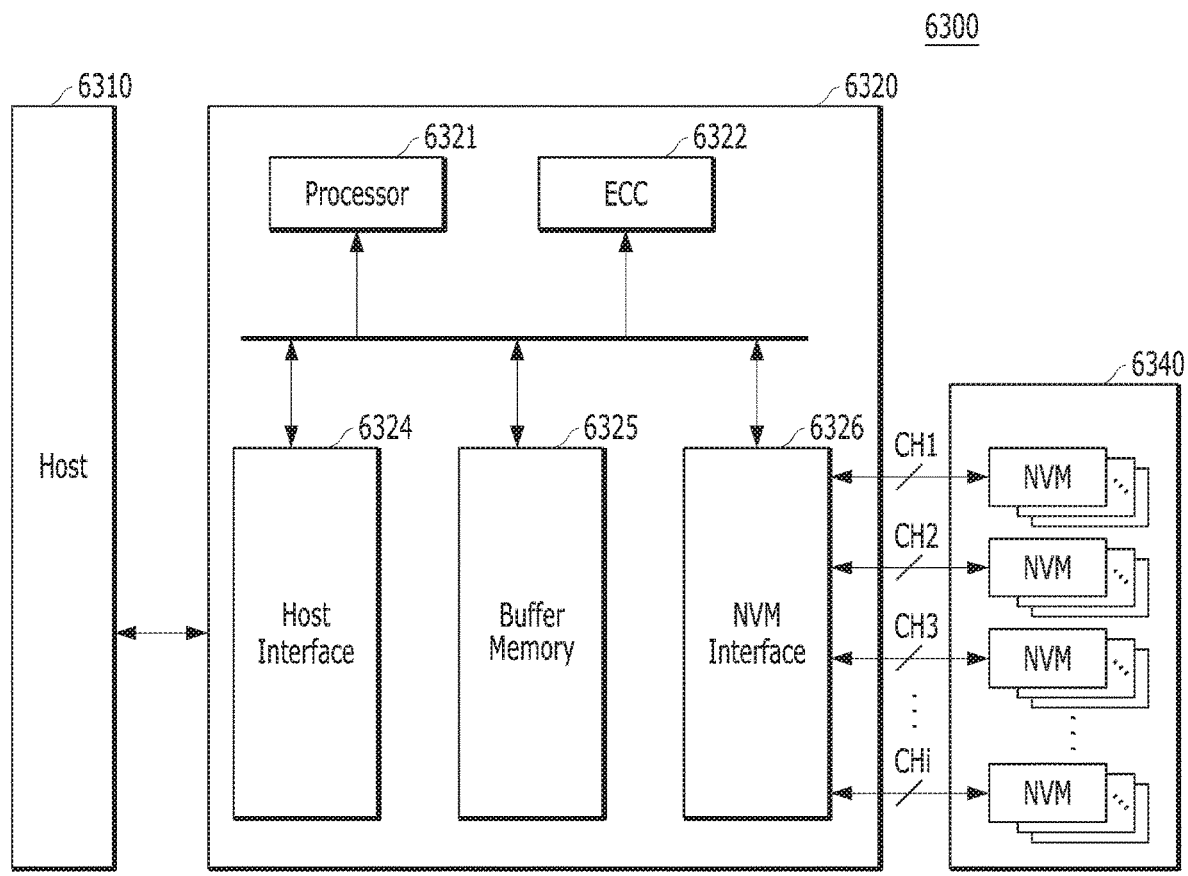

FIG. 9 is a diagram schematically illustrating another example of the data processing system including the memory system in accordance with an embodiment. FIG. 9 schematically illustrates a solid state drive (SSD) 6300 to which the memory system may be applied.

Referring to FIG. 9, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). For convenience of description, FIG. 9 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 10:
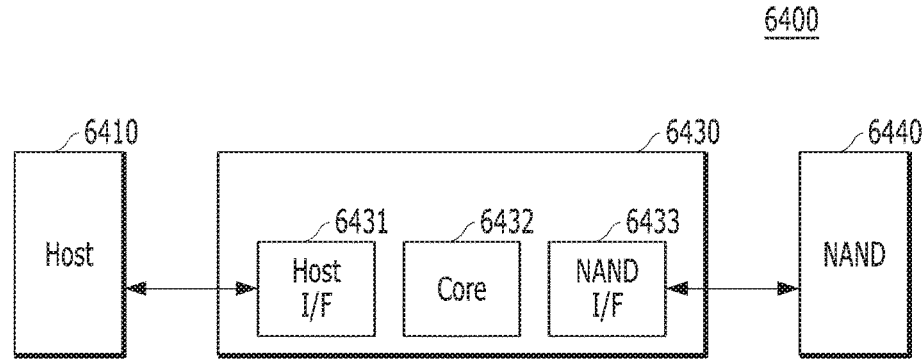

FIG. 10 is a diagram schematically illustrating another example of the data processing system including the memory system in accordance with an embodiment. FIG. 10 schematically illustrates an embedded Multi-Media Card (eMMC) 6400 to which the memory system may be applied.

Referring to FIG. 10, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

Specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 11 to 14 are diagrams schematically illustrating other examples of the data processing system including the memory system in accordance with one or more embodiments. FIGS. 11 to 14 schematically illustrate universal flash storage (UFS) systems to which the memory system may be applied.

Referring to FIGS. 11 to 14, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices, particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 8 to 10, and the UFS cards 6530, 6630, 6730 and 6830 may be embodied in the form of the memory card system 6100 described with reference to FIG. 7.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 11:
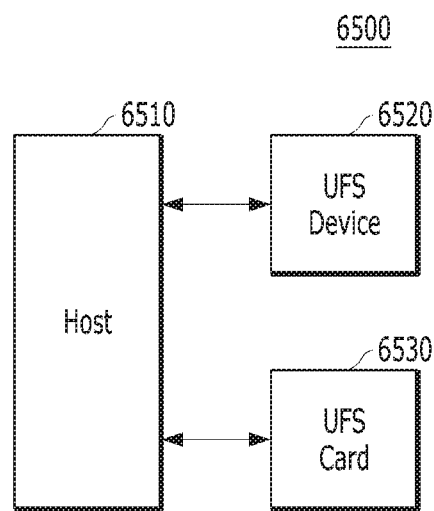

In the UFS system 6500 illustrated in FIG. 11, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 12:
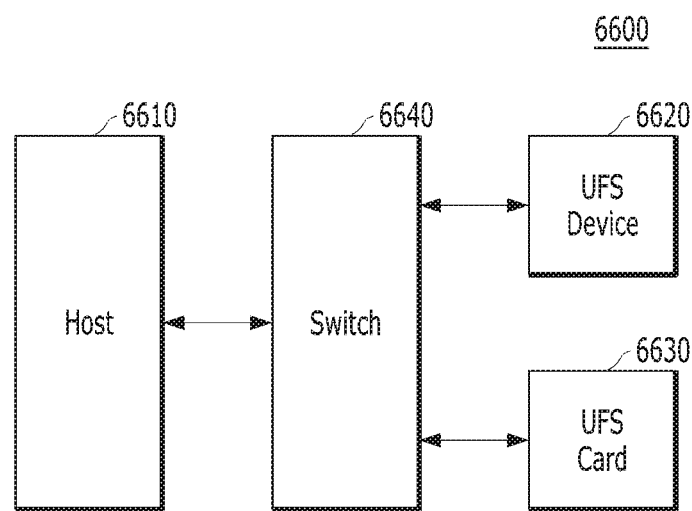

In the UFS system 6600 illustrated in FIG. 12, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 13:
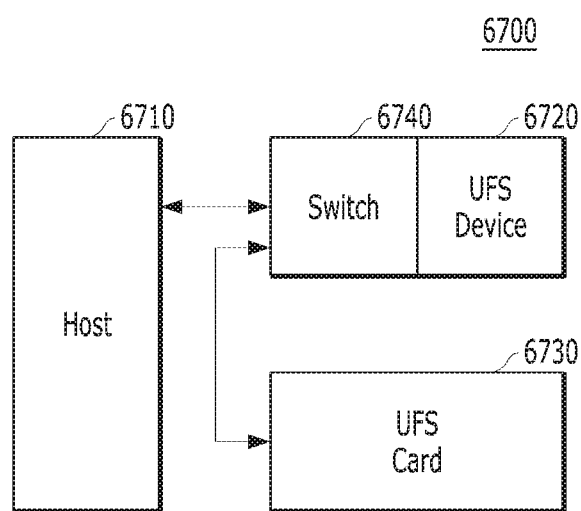

In the UFS system 6700 illustrated in FIG. 13, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 14:
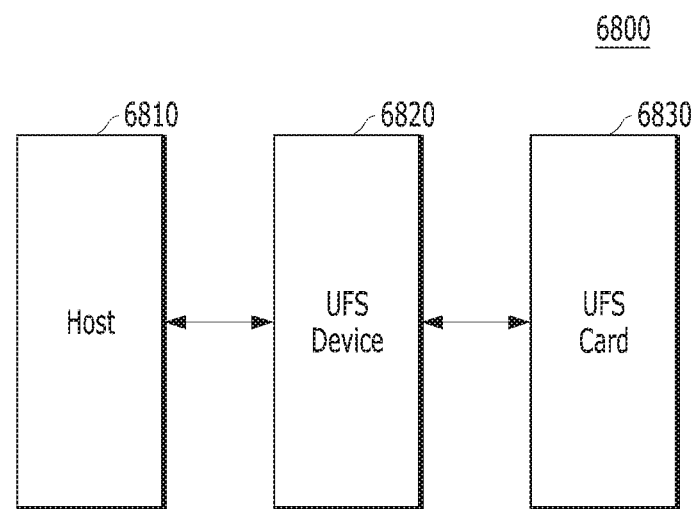

In the UFS system 6800 illustrated in FIG. 14, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 15:
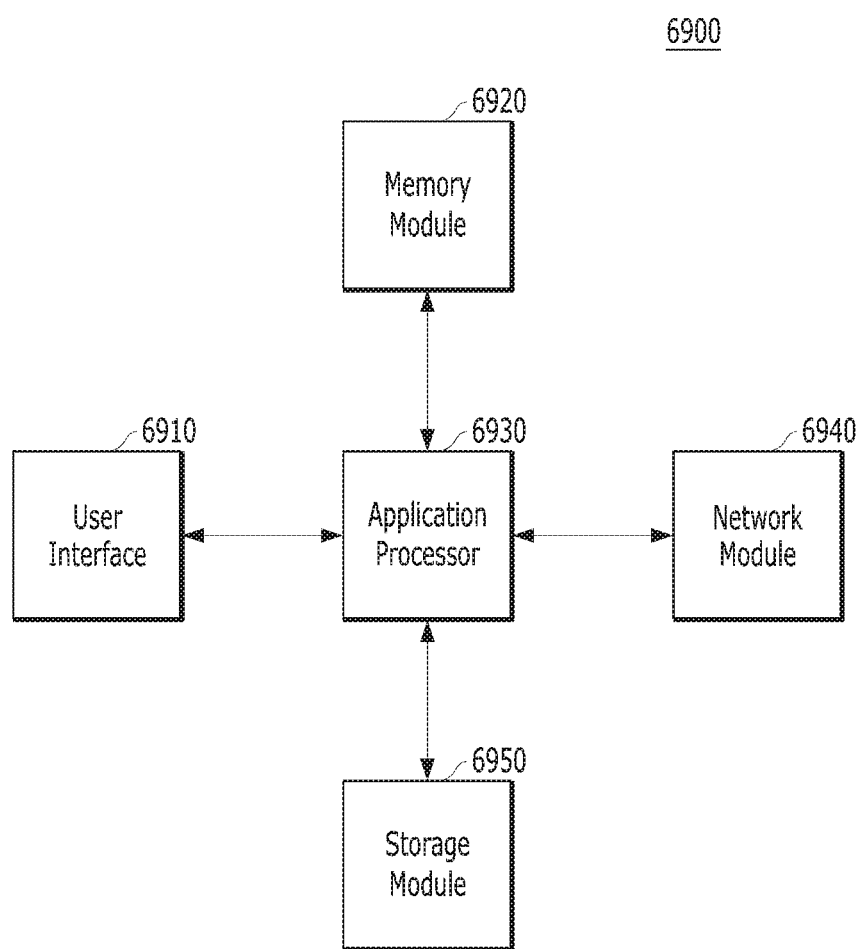

FIG. 15 is a diagram schematically illustrating another example of the data processing system including the memory system in accordance with an embodiment. FIG. 15 is a diagram schematically illustrating a user system 6900 to which the memory system may be applied.

Referring to FIG. 15, the user system 6900 may include a user interface 6910, a memory module 6920, an application processor 6930, a network module 6940, and a storage module 6950.

Specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 9 to 14.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

In accordance with the present embodiment, the data processing system can efficiently process data by utilizing the plurality of modes.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
 a host including a host memory and a first map manager; and
 a memory system including a controller having a second map manager and a memory device suitable for storing system data,
 wherein the host is suitable for providing a first mode request to the memory system,
 wherein the memory system is suitable for:
  providing the system data to the host in response to the first mode request; and
  deactivating the second map manager in response to the first mode request, and wherein the host is further suitable for:
storing, in the host memory, the system data provided from the memory system; and
activating the first map manager when providing the first mode request.

2. The data processing system of claim 1,
wherein the first map manager allocates a physical address to be mapped to a logical address corresponding to a write command,
wherein the host provides the write command, write data and the physical address to the memory system, and
wherein the controller controls the memory device to store the write data according to the physical address.

3. The data processing system of claim 2,
wherein the controller informs the host that the write data is completely stored in response to the write command, and
wherein the host updates the system data stored in the host memory in order to update mapping information between the logical address and the physical address.

4. The data processing system of claim 1,
wherein the host scans a physical address mapped to a logical address corresponding to a read command within the system data stored in the host memory, and provides the read command and the physical address to the memory system, and
wherein the controller controls the memory device to read data according to the physical address, and provides the read data to the host in response to the read command.

5. The data processing system of claim 1,
wherein the host scans a physical address mapped to a logical address corresponding to an erase command within the system data stored in the host memory, and provides the erase command and the physical address to the memory system, and
wherein the controller controls the memory device to erase data according to the physical address, and provides an erase completion response to the host in response to the erase command.

6. The data processing system of claim 1,
wherein the host is further suitable for:
providing a second mode request to the memory system;
providing the system data stored in the host memory to the memory system when providing the second mode request; and
deactivating the first map manager when providing the second mode request, and
wherein the memory system is further suitable for:
storing therein the system data provided from the host; and
activating the second map manager in response to the second mode request.

7. The data processing system of claim 6,
wherein the host provides the memory system with a write request, write data and a logical address corresponding to the write data, and
wherein the second map manager allocates a physical address to be mapped to the logical address, and controls the memory device to store the write data according to the physical address.

8. The data processing system of claim 7, wherein the second map manager updates the system data stored in the memory device to update mapping information between the logical address and the physical address.

9. The data processing system of claim 6,
wherein the host provides the memory system with a read request and a logical address corresponding to the read request, and
wherein the second map manager scans a physical address mapped to the logical address within the system data stored in the memory device, controls the memory device to read data according to the physical address, and provides the read data to the host in response to the read request.

10. The data processing system of claim 6,
wherein the host provides the memory system with an erase request and a logical address corresponding to the erase request, and
wherein the second map manager scans a physical address mapped to the logical address within the system data stored in the memory device, controls the memory device to erase data according to the physical address, and provides an erase completion response to the host in response to the erase request.

11. An operating method of a data processing system, comprising:
providing, by a host, a first mode request to a memory system;
deactivating, by the memory system, a second map manager in the memory system in response to the first mode request;
providing, by the memory system, the host with system data stored in a memory device in the memory system, in response to the first mode request;
storing, by the host, the system data provided from the memory system in a host memory in the host; and
activating, by the host, a first map manager in the host when providing the first mode request.

12. The operating method of claim 11, further comprising:
allocating, by the first map manager, a physical address to be mapped to a logical address corresponding to a write command;
providing, by the host, the memory system with the write command, write data and a physical address of the write data; and
storing, by the memory system, the write data according to the physical address.

13. The operating method of claim 12, further comprising:
informing, by the memory system, the host that the write data is completely stored in response to the write command; and
updating, by the host, the system data stored in the host memory to update mapping information between the logical address and the physical address.

14. The operating method of claim 11, further comprising:
scanning, by the host, a physical address mapped to a logical address corresponding to a read command within the system data stored in the host memory;
providing, by the host, the read command and the physical address to the memory system;
in response to the read command, reading, by the memory system, data according to the physical address; and
providing, by the memory system, the read data to the host.

15. The operating method of claim 11, further comprising:
scanning, by the host, a physical address mapped to a logical address corresponding to an erase command within the system data stored in the host memory;
providing, by the host, the erase command and the physical address to the memory system;

in response to the erase command, erasing, by the memory system, data according to the physical address; and providing, by the memory system, an erase completion response to the host.

16. The operating method of claim 11, further comprising:
providing, by the host, a second mode request to the memory system;
providing, by the host, the system data stored in the host memory to the memory system when providing the second mode request;
deactivating, by the host, the first map manager when providing the second mode request;
storing in the memory device, by the memory system, the system data provided from the host; and
activating, by the memory system, the second map manager in response to the second mode request.

17. The operating method of claim 16, further comprising:
providing, by the host, the memory system with a write request, write data and a logical address corresponding to the write data;
allocating, by the second map manager, a physical address to be mapped to the logical address; and
storing, by the memory system, the write data according to the physical address.

18. The operating method of claim 17, further comprising updating, by the second map manager, the system data stored in the memory device to update mapping information between the logical address and the physical address.

19. The operating method of claim 16, further comprising:
providing, by the host, the memory system with a read request and a logical address corresponding to the read request;
in response to the read request, scanning, by the second map manager, a physical address mapped to the logical address within the system data stored in the memory device;
reading, by the memory device, read data according to the physical address; and
providing, by the memory system, the read data to the host in response to the read request.

20. A data processing system comprising:
a memory device configured to store system data;
a host including a second control unit configured to provide a second mode request and an operational request along with a logical address; and
a controller configured to control the memory device to perform an operation based on the logical address in response to the second mode request and the operational request, and update the system data stored in the memory device according to the operation,
wherein the host further includes a first control unit configured to provide a first mode request,
wherein the controller is further configured to provide system data from the memory device to the host in response to the first mode request,
wherein the host further includes a host memory configured to buffer the system data provided from the controller,
wherein the first control unit is further configured to provide an operational command along with a physical address based on the buffered system data,
wherein the memory device is further configured to perform the operation based on the physical address in response to the operational command, and
wherein the first control unit is further configured to:
update the buffered system data according to the operation; and
control the memory device to update the system data stored therein based on the buffered system data when providing the second mode request.

* * * * *